(12) United States Patent
Do et al.

(10) Patent No.: US 12,555,231 B2
(45) Date of Patent: Feb. 17, 2026

(54) DETECTING ISCHEMIC STROKE MIMIC USING DEEP LEARNING-BASED ANALYSIS OF MEDICAL IMAGES

(71) Applicant: The General Hospital Corporation, Boston, MA (US)

(72) Inventors: Synho Do, Natick, MA (US); Byung Chul Yoon, Winchester, MA (US); Ramon Gilberto Gonzalez, Cambridge, MA (US); Michael H. Lev, Newton, MA (US); Stuart Robert Pomerantz, Needham, MA (US)

(73) Assignee: The General Hospital Corporation, Boston, MA (US)

( * ) Notice: Subject to any disclaimer, the term of this patent is extended or adjusted under 35 U.S.C. 154(b) by 333 days.

(21) Appl. No.: 18/305,627

(22) Filed: Apr. 24, 2023

(65) Prior Publication Data

US 2023/0342928 A1    Oct. 26, 2023

Related U.S. Application Data

(60) Provisional application No. 63/333,671, filed on Apr. 22, 2022.

(51) Int. Cl.
*G06T 7/00* (2017.01)
*G06N 3/045* (2023.01)
(Continued)

(52) U.S. Cl.
CPC ........... *G06T 7/0012* (2013.01); *G06N 3/045* (2023.01); *G06N 3/09* (2023.01); *G16H 30/40* (2018.01);
(Continued)

(58) Field of Classification Search
None
See application file for complete search history.

(56) References Cited

U.S. PATENT DOCUMENTS

| | | | | |
|---|---|---|---|---|
| 2009/0034812 A1* | 2/2009 | Nowinski | ............. | G06T 7/0012 382/131 |
| 2013/0303900 A1* | 11/2013 | Nowinski | ............ | A61B 6/5217 600/425 |

(Continued)

OTHER PUBLICATIONS

Stib M.T., et al., "Detecting large vessel occlusion at multiphase CT angiography by using a deep convolutional neural network.", Radiology. Radiological Society of North America Inc. (2020) 297(3):640-649. doi: 10.1148/ radiol.2020200334.*

(Continued)

*Primary Examiner* — Henok Shiferaw
(74) *Attorney, Agent, or Firm* — QUARLES & BRADY LLP

(57) ABSTRACT

An ischemic stroke mimic is detected, or otherwise predicted, based on medical images acquired from a subject. Medical image data, which include medical images acquired from a head of the subject, are accessed with a computer system. A machine learning model (e.g., one or more deep convolutional neural networks) is trained on training data to estimate a probability of an acute intracranial abnormality being depicted in a medical image. Intracranial abnormality prediction data are generated by inputting the medical image data to the machine learning model. The intracranial abnormality prediction data include an intracranial abnormality probability score for each of the medical images in the medical image data. An ischemic stroke mimic classification for the medical image data is generated based on the intracranial abnormality prediction data, and may be displayed to a user with the computer system.

14 Claims, 11 Drawing Sheets

(51) Int. Cl.
    *G06N 3/09* (2023.01)
    *G16H 30/40* (2018.01)
    *G16H 50/20* (2018.01)

(52) U.S. Cl.
CPC ......... *G16H 50/20* (2018.01); *G06T 2200/04* (2013.01); *G06T 2207/10081* (2013.01); *G06T 2207/20076* (2013.01); *G06T 2207/20081* (2013.01); *G06T 2207/20084* (2013.01); *G06T 2207/30096* (2013.01); *G06T 2207/30104* (2013.01)

(56) References Cited

U.S. PATENT DOCUMENTS

| | | | | |
|---|---|---|---|---|
| 2021/0391059 | A1* | 12/2021 | Park | G06T 7/0012 |
| 2022/0092772 | A1* | 3/2022 | Yuh | A61B 6/032 |
| 2022/0180512 | A1* | 6/2022 | Oh | G06T 7/30 |
| 2022/0198662 | A1* | 6/2022 | Ay | A61B 5/7267 |
| 2023/0377319 | A1* | 11/2023 | Kasischke | G06V 10/776 |

OTHER PUBLICATIONS

Arbabshirani M.R., et al., "Advanced machine learning in action: identification of intracranial hemorrhage on computed tomography scans of the head with clinical workflow integration" NPJ Digital Medicine. Springer Science and Business Media LLC (2018) 1(1):9. doi: 10.1038/s41746-017-0015-z.

Campagner A., et al., "Three-Way Decision for Handling Uncertainty in Machine Learning: A Narrative Review." Lecture Notes in Computer Science (including subseries Lecture Notes in Artificial Intelligence and Lecture Notes in Bioinformatics). Springer (2020) p. 137-152. doi: 10.1007/978-3-030-52705-1_10.

Højsgaard, S., et al. "The R Package geepack for Generalized Estimating Equations" Journal of Statistical Software (2006)15(2), pp. 1-11. https://doi.org/10.18637/jss.v015.i02.

Hüllermeier E., et al., "Aleatoric and epistemic uncertainty in machine learning: an introduction to concepts and methods." Machine Learning. Springer (2021) 110 (3) pp. 457-506. doi: 10.1007/s10994-021-05946-3.

Lee H., et al., "An explainable deep-learning algorithm for the detection of acute intracranial haemorrhage from small datasets." Nature Biomedical Engineering. NaturePublishing Group (2019) 3(3) pp. 173-182. doi: 10.1038/s41551-018-0324-9.

O'Neill T.J., et al., "Active Reprioritization of the Reading Worklist Using Artificial Intelligence Has a Beneficial Effect on the Turnaround Time for Interpretation of Head CT withIntracranial Hemorrhage." Radiology: Artificial Intelligence. Radiological Society of North America (RSNA) (2021) 3(2):e200024. doi: 10.1148/ryai.2020200024.

Rava R.A., et al., "Assessment of an Artificial Intelligence Algorithm for Detection of Intracranial Hemorrhage" World Neurosurgery. Elsevier BV (2021) 150:e209-e217.doi: 10.1016/j.wneu.2021.02.134.

Zhou Z., et al., "Computer-aided detection of brain metastases in T1-weighted MRI for stereotactic radiosurgery using deep learning single-shot detectors." Radiology. Radiological Society of North America Inc. (2020) 295(2) pp. 407-415. doi:10.1148/radiol.2020191479.

* cited by examiner

DETECTING ISCHEMIC STROKE MIMIC USING DEEP LEARNING-BASED ANALYSIS OF MEDICAL IMAGES

CROSS-REFERENCE TO RELATED APPLICATIONS

This application claims the benefit of U.S. Provisional Patent Application Ser. No. 63/333,671, filed on Apr. 22, 2022, and entitled "ACUTE ISCHEMIC STROKE MIMIC DETECTOR," which is herein incorporated by reference in its entirety.

BACKGROUND

Acute ischemic stroke every year afflicts more than 3 million people worldwide and is a leading cause of death and disability. Many such patients may be treated successfully, but the cause of the stroke must be identified. The first step is excluding brain diseases that produce symptoms just like acute ischemic stroke, which are referred to as mimics.

The prompt interpretation of head CT scans of patients presenting to an emergency department is essential and machine learning (ML) tools can potentially enhance this goal. Most ML algorithms developed for the identification of abnormalities on imaging utilize dichotomous classifications where an algorithm determines whether an abnormality is present or not. However, imaging findings may be indeterminate.

SUMMARY OF THE DISCLOSURE

It is one aspect of the present disclosure to provide a method for predicting a presence of an ischemic stroke mimic based on medical images acquired from a subject. Medical image data are accessed with a computer system, where the medical image data include medical images acquired from a head of the subject with a medical imaging system. A machine learning model is also accessed with the computer system, where the machine learning model has been trained on training data to estimate a probability of an acute intracranial abnormality being depicted in a medical image. Intracranial abnormality prediction data are generated by inputting the medical image data to the machine learning model using the computer system, generating the intracranial abnormality prediction data as an output. The intracranial abnormality prediction data include an intracranial abnormality probability score for each of the medical images in the medical image data. An ischemic stroke mimic classification is generated for the medical image data using the computer system to classify the medical image data based on the intracranial abnormality prediction data. The ischemic stroke mimic classification may be displayed to a user with the computer system.

DETAILED DESCRIPTION

Described here systems and methods for detecting, or otherwise predicting, the presence of ischemic stroke mimic using a deep learning-based analysis of medical images, such as CT images. Mimics of ischemic stroke can include vestibular dysfunction, intracranial hemorrhage, mass lesions, vascular malformation, abscess, edema, toxic-metabolic abnormalities, herniation, paralysis, difficulty speaking, and so on. Distinguishing these mimics of ischemic stroke is a first step in rapid diagnosis and proper treatment of patients.

The present disclosure describes an explainable deep learning model for the detection and classification of intracranial abnormalities other than ischemia; that is, mimics of ischemic stroke. The described systems and methods implement a deep learning model that analyzes medical images (e.g., CT images) and predicts the presence or absence of intracranial abnormalities, such as by estimating probability scores for a medical images depicting intracranial abnormalities. The medical image data may be classified as probable, or not, for ischemic stroke mimic based on these probability scores.

In addition, the systems and methods may generate a radiology atlas that contains representative visual depictions (e.g., training images from a dataset used to train the deep learning system) of significant features for the intracranial abnormalities. During analysis of a given input image, the system may extract training images from the radiology atlas that contain the features that were considered with high importance when making a prediction for a given input image. In some examples, each unique feature atlas may be created, stored, and retrieved again for later use. The features of this deep learning model may be initially created in a normalized form, and then the atlas(es) may be expanded by using new data. This is particularly effective because it not only reliably detects problematic features, but can also derive quantified results according to user feedback as it is used. Advantageously, false positives and false negatives can be reduced significantly using this approach.

Figure 1:
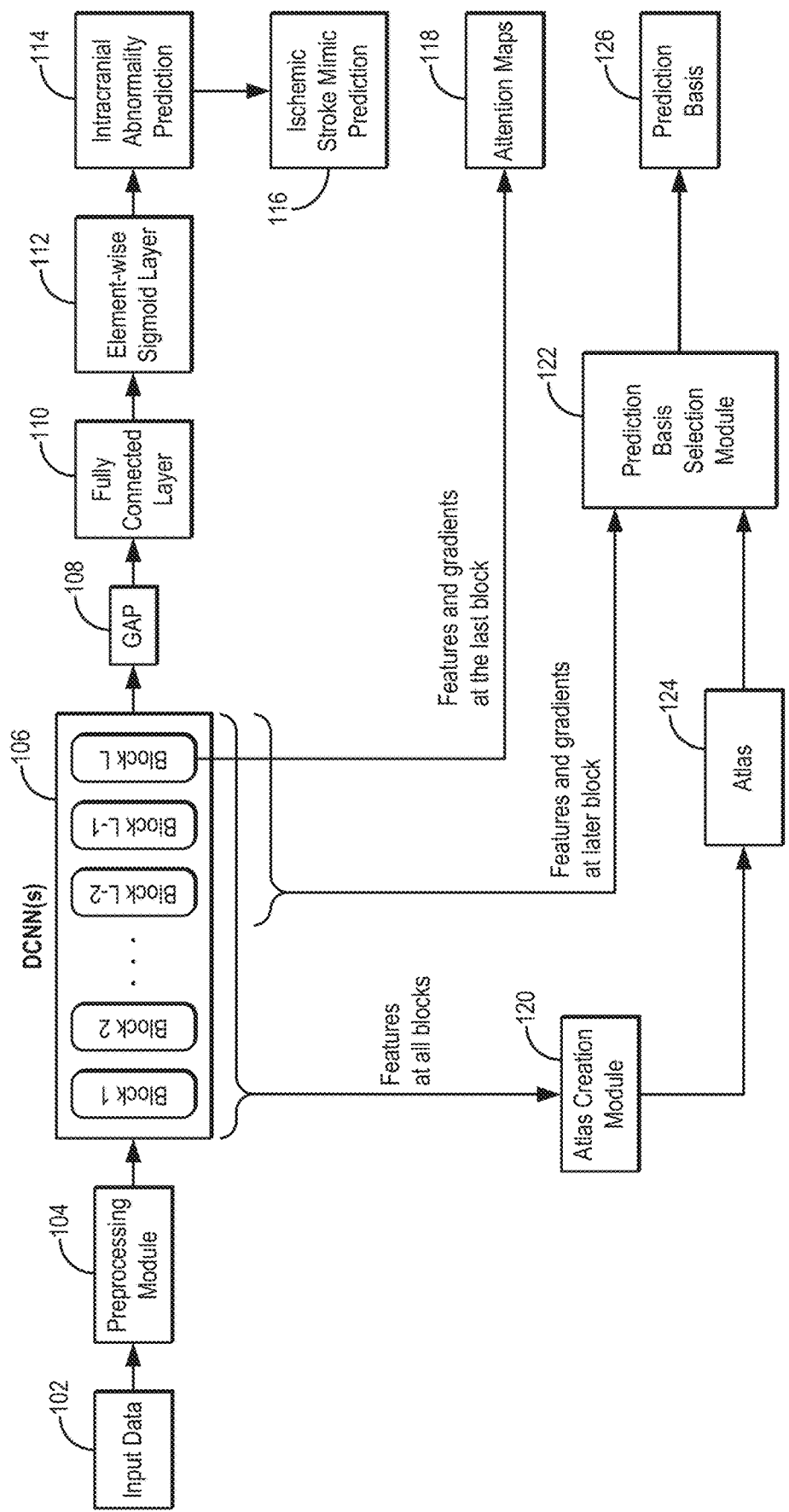
FIG. 1 is a block diagram of an example system and workflow for detecting mimics of ischemic stroke based on a deep learning analysis of medical images.

FIG. 1 is a block diagram of an example system 100 for predicting the presence of ischemic stroke mimics based on the analysis of medical images (e.g., CT images) acquired from a subject. The workflow includes an input 102, a preprocessing module 104, and one or more deep convolutional neural networks ("DCNN(s)") 106. The system 100 may optionally include an atlas creation module 120, and a prediction basis selection module 122.

The input 102 receives image data as an input. The image data received at input 102 may include a plurality of slices, for example, 2D axial slices from a head scan or a 3D image volume containing a plurality of slices. The medical images may be CT images, or images acquired with another suitable medical imaging modality. For instance, the image data may include unenhanced CT images.

An image received at input 102 (or a slice of the 3D scan received at input 102) is provided to the preprocessing module 104. The preprocessing module 104 may perform various preprocessing techniques to improve performance of the DCNN(s) 106. In addition, various optimization techniques (discussed further below) may be utilized to improve performance of the DCNN(s) 106. In some examples, the preprocessing techniques performed by the preprocessing module 104 and the optimization techniques may be performed iteratively. Greater performance gains may be achieved by iteratively adding preprocessing and network optimization techniques.

As a non-limiting example, preprocessing module 104 may perform real-time data augmentation by applying geometric transformations and/or nonlinear denoising filtering to improve the generalizability of the model to different rotations, scales, translations, and noise. In addition, the preprocessing module 104 may perform multi-window conversion and slice interpolation. These techniques may be used to address the relatively small size of the training dataset and are based on the workflow of radiologists. High performance may be achieved from a relatively small-sized training dataset by mimicking the workflow of radiologists.

The preprocessing module 104 may also perform slice interpolation. Slice interpolation may be used to mimic how radiologists integrate information from all adjacent images of a contiguous 3D image volume concurrently, rather than examine each single axial 2D slice in isolation. Interpolated images from adjacent slices may be provided to the system 100 with a modified loss function during training to imitate the 3D integration of image interpolation by radiologists. This technique may be used to reduce the false positive interpretation by the system of partial volume effects and intracranial calcifications. Slice interpolation techniques allow the system 100 to take into account neighboring slices and reduce false positive rates. During training, input image x, and label y, are fed through the DCNN 106 together with interpolated data with adjacent slices to optimize a selected loss function.

The preprocessed image (or slice) is analyzed by the DCNN(s) 106, including a global average pooling ("GAP") layer 108, a fully connected layer 110, and an element-wise sigmoid layer 112. In some examples, the DCNN 106 includes a plurality of DCNNs. In one example, the DCNN 106 includes a VGG16 network, a ResNet-50 network, an Inception-v3 network, an Inception-ResNet-v2 network, or combinations thereof. In some examples, each DCNN 106 used may be pretrained using the ImageNet image database, for example, a subset of the ImageNet used for the classification task in the ImageNet Large Scale Visual Recognition Challenge (ILSVRC) 2012. The pretrained DCNNs may then fine-tuned with a training dataset specific to intracranial abnormalities.

Figure 2:
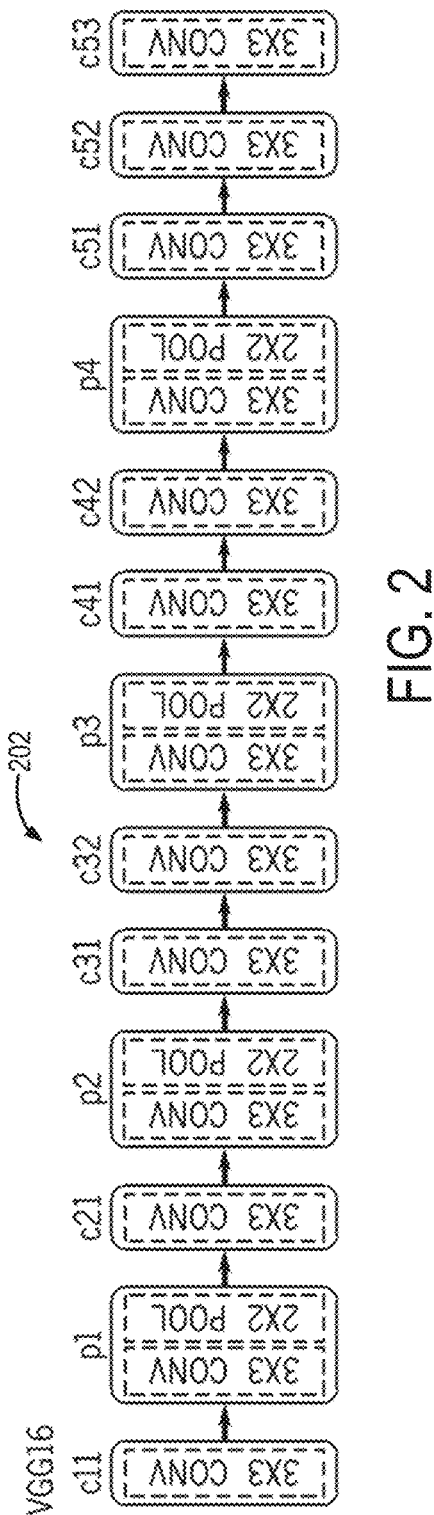
FIG. 2 shows an example VGG16 network topology.
Figure 3:
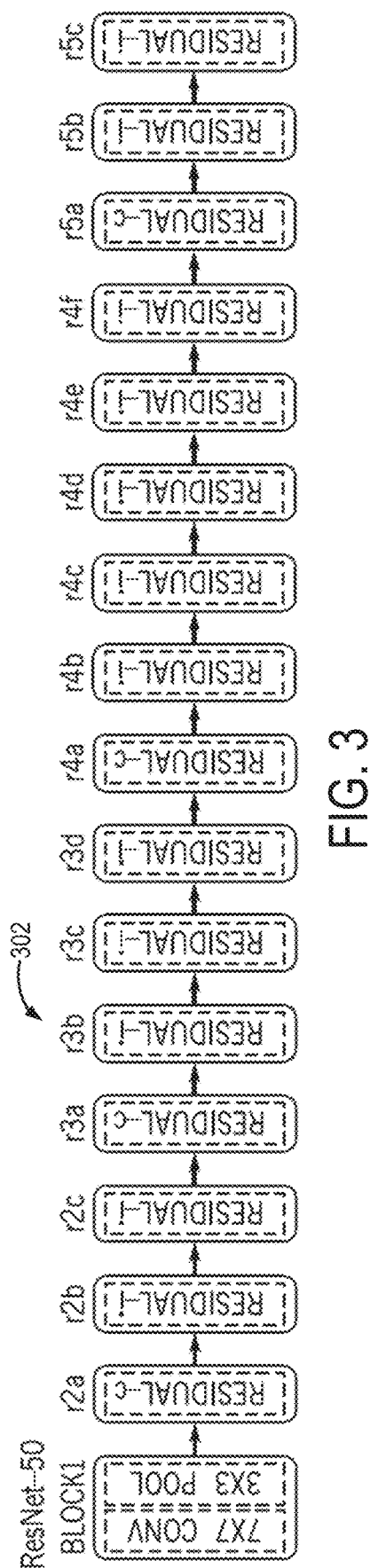
FIG. 3 shows an example ResNet-50 network topology.
Figure 4:
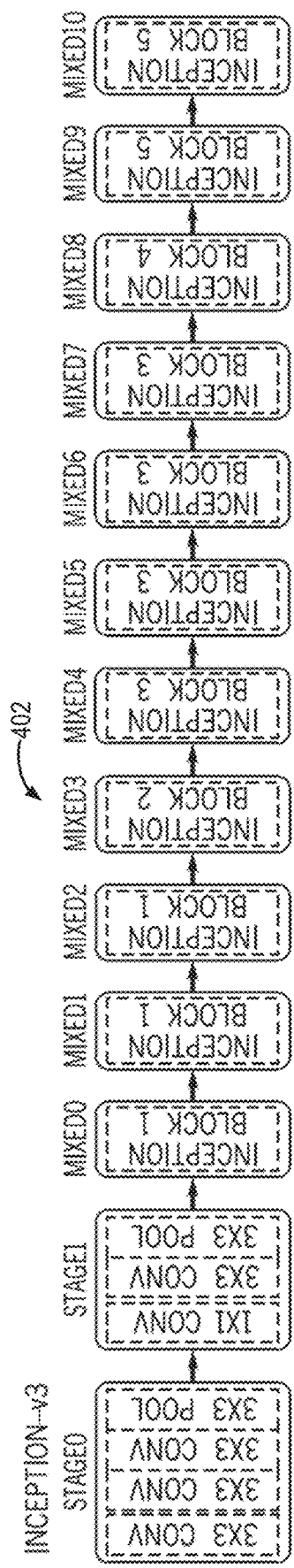
FIG. 4 shows an example Inception-v3 network topology.
Figure 5:
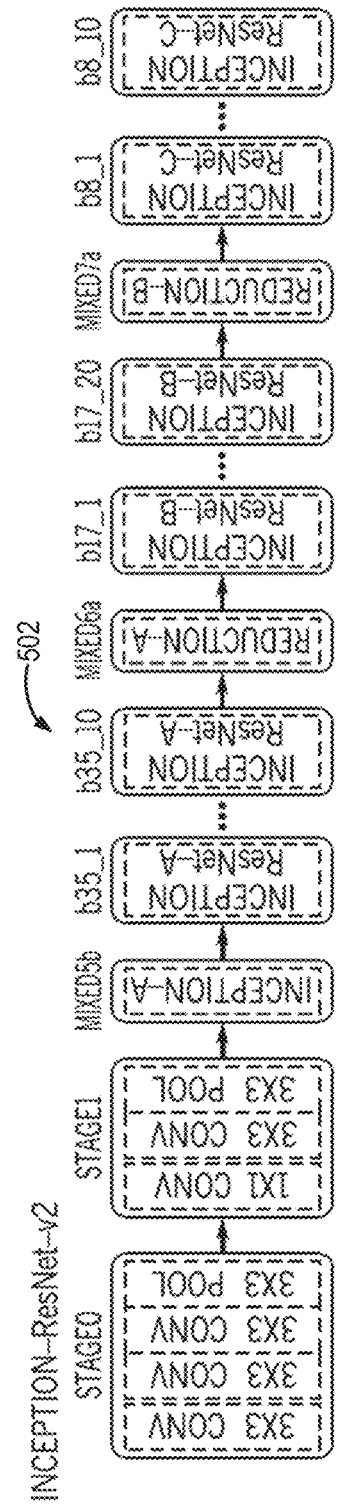
FIG. 5 shows an example Inception-ResNet-v2 network topology.

As described, the DCNN 106 may include a plurality of DCNNs in some examples. FIGS. 2-5 show the network topologies of four example DCNN models that may be used in various examples. In each of FIGS. 2-5, the network topologies are shown before the last fully-connected layer. FIG. 2 is a block diagram of a network topology for a VGG16 network 202. VGG16 is composed of a sequence of convolutional and pooling layers with a kernel size of 3×3 and 2×2, respectively. FIG. 3 is a block diagram of a network topology for a ResNet-50 network 302. ResNet-50 is composed of a convolutional and a pooling layer in the earlier parts of the network, and sequential residual building blocks in the later parts. FIG. 4 is a block diagram of a network topology for an Inception-v3 network 402. Inception-v3 is composed of a sequence of convolutional layers, pooling layers, and inception modules. FIG. 5 is a block diagram of a network topology for an Inception-ResNet-v2 network 502. Inception-ResNet-v2 is composed of inception modules with residual connections.

The DCNN 106 generates a prediction 114 that indicates if an abnormality (e.g., an intracranial abnormality) has been detected (e.g., the probability of an abnormality being present in the respective image). For example, the prediction 114 may indicate the probability of the presence of intracranial abnormalities in each of the slices in the input image data. Intracranial abnormalities may include conditions such as such as diffuse cerebral edema, masses, vascular malformations, mass effect (e.g. herniation/midline shift and partial/complete effacement of the ventricles), among others. In some examples, the DCNN 106 may generate an output based on an ensemble model that combines the probabilities from the plurality of DCNNs. For example, the ensemble model may be defined as the unweighted average of the probabilities of the presence of intracranial abnormalities predicted by each of the DCNNs.

The intracranial abnormality probability scores for each slice are then analyzed to assign an ischemic stroke mimic prediction 116 that classifies the image data as being positive for ischemic stroke mimic, negative for ischemic stroke mimic, or indeterminate. For instance, the image data may be classified as positive for ischemic stroke mimic (e.g., probable for the imaged subject having a condition consistent with a mimic of ischemic stroke) when at least three slices, whether contiguous slices or not, have an intracranial abnormality probability score of a first threshold (e.g., 0.9 or greater, in some examples); the image data may be classified as negative for ischemic stroke mimic (e.g., not probable for the imaged subject having a condition consistent with a mimic of ischemic stroke) when none of the slices have an intracranial abnormality probability score greater than or equal to a second threshold (e.g., 0.6), or when a small fraction of the slices (e.g., only one of the slices) has an intracranial abnormality probability score greater than or equal to the second threshold; and the image data may be classified as indeterminate when neither of the previous conditions are satisfied.

In some examples, an attention (or activation) map 118 may be generated for each intracranial abnormality result based on the features and gradients at the last block in the DCNN 106. An atlas creation module 120 and prediction basis selection module 122 form a visualization tool that may be used to generate an atlas (or radiology atlas) 124 and display a prediction basis 126. As discussed further below, the atlas 124 may be created using a training dataset specific to the intracranial abnormalities. The atlas creation module 120 receives features from all of the blocks (or layers) of the DCNN 106. The atlas 124 includes a set of training images (or training image patches) and attention maps that correspond to significant features of each of one or more intracranial abnormalities. The prediction basis selection module 122 receives features from the later blocks (or layers) of the DCNN 106 and retrieves training images from the atlas 124 that contain significant features relevant to the analyzed input image to provide a prediction basis 126. The training images retrieved from the atlas 124 as a prediction basis provide an explanation for the intracranial abnormality predictions 114 and/or ischemic stroke mimic predictions 116 made by the system based on the analysis of the input image data.

Showing morphologically similar, prelabeled cases of specific intracranial abnormalities compared to the input image data being analyzed can be helpful for users with insufficient experience with ischemic stroke mimics. By reviewing the attention map 118 and the prediction basis 126, a user can understand the intracranial abnormality prediction 114 and/or ischemic stroke mimic prediction 116 of the system. This may increase confidence levels of clinicians for making or excluding a diagnosis and may also provide educational feedback at the point-of-care that will benefit non-experts such as residents, general radiologists, and other non-radiologist clinicians.

As described, the system 100 analyzes an image and generates intracranial abnormality predictions 114, an attention map 118, and a prediction basis 126. For each medical image identified as having a probable intracranial abnormality, an attention map 118 may be generated. The attention map 118 indicates significant pixels in the analyzed medical image for the prediction by the system to the target label. As described below, the attention map(s) 118 may be displayed to a user. In some examples the attention map(s) 118 may be color-coded to indicate the significant pixels in the analyzed medical image. Another output of the system 100 is a prediction basis 126. Each prediction basis 126 includes training images retrieved from the atlas 124 that are associated with or assigned to the features that are most relevant to the analyzed medical image to explain the prediction of a particular intracranial abnormality.

As mentioned above, an atlas creation module 120 may be used to create an atlas 124. In general, a medical condition (e.g., intracranial abnormality) specific training dataset (e.g., including training images) used to train the DCNN 106 is provided again to the fully trained DCNN. The training dataset may contain various representations of different intracranial abnormalities. Training images are fed through the trained network to obtain the corresponding filter responses at each block (or layer) of the DCNN 106. Activation maps are generated for each filter from each block. The activation maps may be sorted by their maximum activation values from highest to lowest. The relevance of each activation map to a particular label may be quantified. In other examples, the relevance of each activation map to a particular intracranial abnormality label may be quantified by counting the number of activation maps assigned to the label consecutively from the top. For example, if the activation map with the highest maximum value is labeled as diffuse cerebral edema and vascular malformation and the second highest is labeled as diffuse cerebral edema, the relevance count is 2 for diffuse cerebral edema, 1 for vascular malformation, and 0 for all other labels. The most relevant or significant features for each subtype may be selected for the atlas. In one embodiment, all activation maps at all blocks for each label may be sorted from the highest to the lowest relevance count and a certain percentage of them, for example, the top 5% may be selected as having salient features to best represent the image assigned with the label as components of the atlas. An atlas may be generated using the activation maps and corresponding image patches (e.g., the training images) for the selected features. In some examples, each selected feature that is associated with an intracranial abnormality may be assigned to or associated with at least one training image. The atlas may be stored with a computer system, such as in a memory or other data storage device or medium. Additionally or alternatively, the computer system may store the atlas remotely, such as in a database, on a server, or the like.

The atlas 124 may be used to generate a prediction basis 126. For example, a medical image may be provided to the input 102 of the system 100 and passed to the DCNN(s) 106. Features and corresponding gradients from the final block (or convolutional layer) of the DCNN 106 may be extracted and used to generate an attention map 118 that highlights the important regions relevant to the predictions of the model. In an embodiment, a class activation mapping ("CAM") technique may be applied to generate the attention map 118. The CAM technique generates attention maps highlighting the important regions in a test image for the model prediction to a target label. Feature maps and the corresponding gradients may also be extracted from the later blocks of the DCNN 106. Individual attention maps may be generated using the CAM technique. Distances (e.g., L2 distances) between each of the individual attention maps and the overall attention map may be calculated.

The features (and attention maps) are sorted by distance from lowest to highest and a set of the features that are significant (e.g., the attention maps with the lowest distance) for the result (or prediction) by the system are selected. For example, the top five features which are significant for the result (or prediction) by the system may be selected. The selected features (or attention maps) may be used as an index to retrieve representative training images from the atlas 124 with similar significant features to provide a prediction basis 126 of the intracranial abnormality prediction 114 of the system 100 for the analyzed medical image. The prediction basis 126 (i.e., the training images retrieved from the atlas 124) may be displayed to the user with a computer system.

Figure 6:
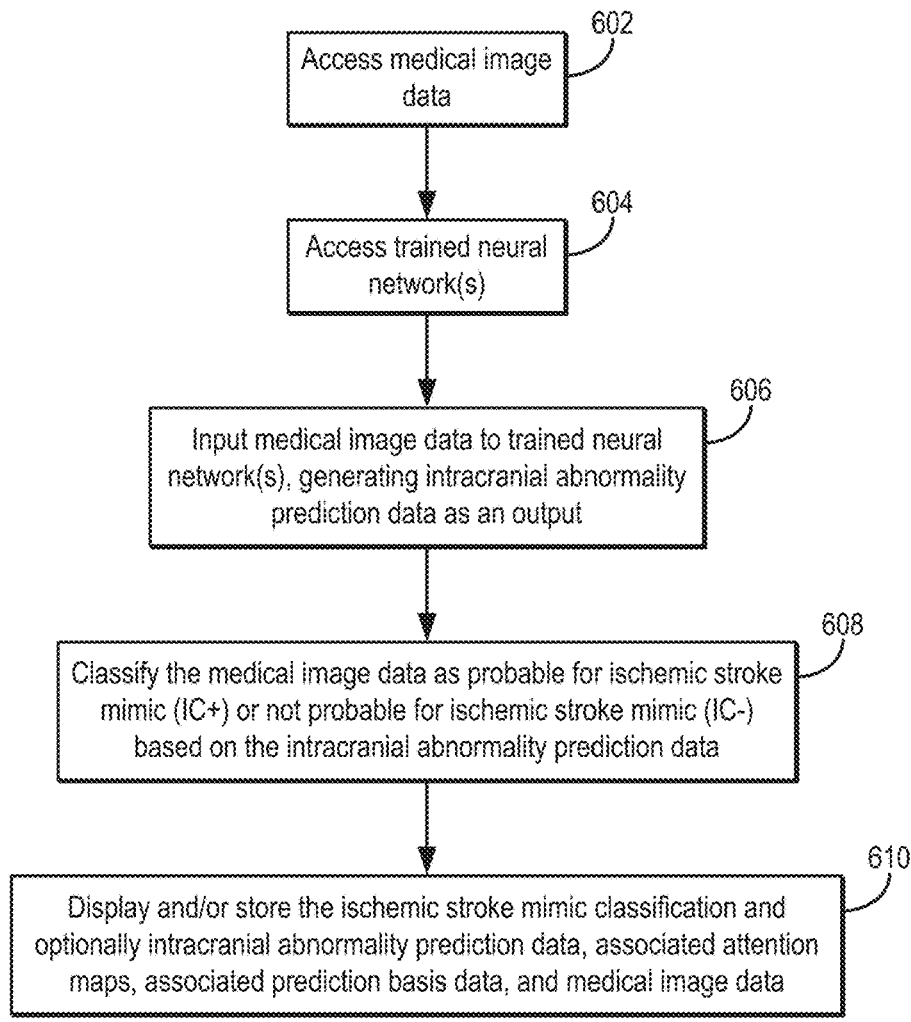
FIG. 6 is a flowchart setting forth the steps of an example method for classifying medical image data as being probable, or not, for ischemic stroke mimic.

Referring now to FIG. 6, a flowchart is illustrated as setting forth the steps of an example method for classifying medical images as indicating the presence of a mimic of ischemic stroke based on intracranial abnormality probability scores generated using one or more suitably trained neural networks or other machine learning algorithms. As will be described, the neural networks or other machine learning algorithms take medical images (e.g., a plurality of 2D slices, a 3D image volume containing a plurality of slices) as input data and generate intracranial abnormality prediction data as an output. As an example, the intracranial abnormality prediction data can include probability scores estimating the presence of intracranial abnormalities, such as diffuse cerebral edema, masses, vascular malformations, mass effect (e.g. herniation/midline shift and partial/complete effacement of the ventricles), among others.

The method includes accessing medical image data with a computer system, as indicated at step 602. Accessing the medical image data may include retrieving such data from a memory or other suitable data storage device or medium. Additionally or alternatively, accessing the medical image data may include acquiring such data with CT system or other suitable medical imaging system and transferring or otherwise communicating the data to the computer system, which may be a part of the CT system or other suitable medical imaging system. The medical image data may include a plurality of slices (e.g., 2D axial slices from a head CT scan) and/or a 3D image volume containing a plurality of slices.

One or more trained neural networks (or other suitable machine learning algorithms) are then accessed with the computer system, as indicated at step 604. In general, each neural network is trained, or has been trained, on training data in order to estimate the probability that a medical image depicts an intracranial abnormality. Accessing the trained neural network(s) may include accessing network parameters (e.g., weights, biases, or both) that have been optimized or otherwise estimated by training the neural network on training data. In some instances, retrieving the neural network can also include retrieving, constructing, or otherwise accessing the particular neural network architecture to be implemented. For instance, data pertaining to the layers in the neural network architecture (e.g., number of layers, type of layers, ordering of layers, connections between layers, hyperparameters for layers) may be retrieved, selected, constructed, or otherwise accessed.

An artificial neural network generally includes an input layer, one or more hidden layers (or nodes), and an output layer. Typically, the input layer includes as many nodes as inputs provided to the artificial neural network. The number (and the type) of inputs provided to the artificial neural network may vary based on the particular task for the artificial neural network.

The input layer connects to one or more hidden layers. The number of hidden layers varies and may depend on the particular task for the artificial neural network. Additionally, each hidden layer may have a different number of nodes and may be connected to the next layer differently. For example, each node of the input layer may be connected to each node of the first hidden layer. The connection between each node of the input layer and each node of the first hidden layer may be assigned a weight parameter. Additionally, each node of the neural network may also be assigned a bias value. In some configurations, each node of the first hidden layer may not be connected to each node of the second hidden layer. That is, there may be some nodes of the first hidden layer that are not connected to all of the nodes of the second hidden layer. The connections between the nodes of the first hidden layers and the second hidden layers are each assigned different weight parameters. Each node of the hidden layer is generally associated with an activation function. The activation function defines how the hidden layer is to process the input received from the input layer or from a previous input or hidden layer. These activation functions may vary and be based on the type of task associated with the artificial neural network and also on the specific type of hidden layer implemented.

Each hidden layer may perform a different function. For example, some hidden layers can be convolutional hidden layers which can, in some instances, reduce the dimensionality of the inputs. Other hidden layers can perform statistical functions such as max pooling, which may reduce a group of inputs to the maximum value; an averaging layer; batch normalization; and other such functions. In some of the hidden layers each node is connected to each node of the next hidden layer, which may be referred to then as dense layers. Some neural networks including more than, for example, three hidden layers may be considered deep neural networks.

The last hidden layer in the artificial neural network is connected to the output layer. Similar to the input layer, the output layer typically has the same number of nodes as the possible outputs. In an example in which the artificial neural network estimates the probability that medical image data depict intracranial abnormalities, the output layer may include, for example, a number of different nodes. In some instances, each different node may correspond to a different medical image in the medical image data (e.g., a different slice). In these instances, each medical image is assigned a probability score value indicating the likelihood that the medical image depicts an intracranial abnormality. In some other instances, each different node may correspond to a different class of intracranial abnormality (e.g., diffuse cerebral edema, masses, vascular malformations, mass effect (e.g. herniation/midline shift and partial/complete effacement of the ventricles), etc.). In these instances, each node outputs a probability score for each different class of intracranial abnormality for a particular medical image in the medical image data.

The medical image data are then input to the one or more trained neural networks, generating output as intracranial abnormality prediction data, as indicated at step 606. For example, the intracranial abnormality prediction data may indicate the probability score for each medical image (e.g., each slice) in the medical image data depicting one or more intracranial abnormalities. In some instances, the probability scores indicate the likelihood that a medical image depicts an intracranial abnormality without identifying the type of intracranial abnormality. In some other instances, the probability scores may indicate the likelihood of a medical image depicting a particular type of intracranial abnormality (e.g., diffuse cerebral edema, masses, vascular malformations, mass effect (e.g. herniation/midline shift and partial/complete effacement of the ventricles), etc.). As described above, in some examples the one or more trained neural networks may also output atlases, attention maps, and/or prediction basis data.

The intracranial abnormality prediction data are then analyzed by the computer system to generate an ischemic stroke mimic classification for the medical image data, as indicated at step 608. As described above, the probability scores in the intracranial abnormality prediction data are analyzed by comparing the scores for each medical image in the medical image data to one or more threshold values. When a number of the medical images have probability scores at or above a first threshold, the medical image data are classified as being probable for an ischemic stroke mimic (IC+). For example, the number of medical images may be three or more medical images. The first threshold may be 0.9. When none of the medical images (or when fewer than a selected number of medical images) have probability scores at or above a second threshold, the medical image data may be classified as not being probable for an ischemic stroke mimic (IC−). For example, the selected number of medical images may be two, such that only one of the medical images has a probability score at or above the second threshold while the other medical images have probability scores below the second threshold. The second threshold may be 0.6. Medical image data that do not satisfy a selected criteria may be classified as indeterminate.

The ischemic stroke mimic classification can then be displayed to a user, stored for later use or further processing, or both, with the computer system, as indicated at step 610. Additionally, one or more of the, intracranial abnormality prediction data, the medical image data, attention map(s), or prediction basis may also be displayed to a user, stored for later use or further processing, or both. For example, the ischemic stroke mimic classification and optionally other data may be displayed to the user as part of a generated report. In some instances, the intracranial abnormality predication data may also be displayed, such as by displaying the probabilities for the presence of intracranial abnormalities for each medical image (e.g., as a graph, numerical values, or the like). In some other instances, the ischemic stroke mimic classification may be stored in the electronic health record ("EHR") for the subject. Additionally or alternatively, the attention map(s) and/or prediction basis may also be stored in the EHR for the subject.

Figure 7:
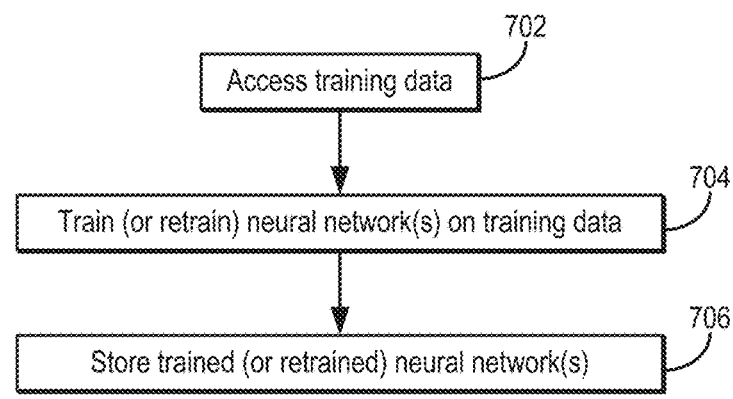
FIG. 7 is a flowchart setting forth the steps of an example method for training a machine learning model (e.g., one or more deep convolutional neural networks) generate intracranial abnormality prediction data.

Referring now to FIG. 7, a flowchart is illustrated as setting forth the steps of an example method for training one or more neural networks (or other suitable machine learning algorithms) on training data, such that the one or more neural networks are trained to receive medical image data as input data in order to generate intracranial abnormality prediction data as output data, where the intracranial abnormality prediction data are indicative of intracranial abnormality probability scores for medical images in the medical image data.

The method includes accessing training data with a computer system, as indicated at step 702. Accessing the training data may include retrieving such data from a memory or other suitable data storage device or medium. Alternatively, accessing the training data may include acquiring such data with a medical imaging system and transferring or otherwise communicating the data to the computer system.

In general, the training data can include medical images (e.g., CT images, MR images). As a non-limiting example, a training dataset may include a large volume of non-contrast head CT images (e.g., 1,000 or more such images). The images may be, for example, axial images. In some embodiments, the training data may include medical images that have been labeled (e.g., labeled as containing patterns, features, or characteristics indicative of intracranial abnormalities, and the like).

Additionally or alternatively, the training data may also include patient health data collected for the patients associated with the medical images. For example, patient health data may include clinical information derived from electronic health records, and may include demographic data, rates of admission, neurosurgical intervention, and 30-day mortality, among others. Neurosurgical interventions may include craniotomy, craniectomy, cranioplasty, ventricular catheter placement or removal, biopsy, and neuro interventional radiology procedures.

The method can include assembling training data from medical images using a computer system. This step may include assembling the medical images into an appropriate data structure on which the neural network or other machine learning algorithm can be trained. Assembling the training data may include assembling medical images, segmented medical images, and other relevant data. For instance, assembling the training data may include generating labeled data and including the labeled data in the training data. Labeled data may include medical images, segmented medical images, or other relevant data that have been labeled as belonging to, or otherwise being associated with, one or more different classifications or categories. For instance, labeled data may include medical images and/or segmented medical images that have been labeled as being associated with different intracranial abnormalities, such as diffuse cerebral edema, masses, vascular malformations, mass effect (e.g. herniation/midline shift and partial/complete effacement of the ventricles), among others.

One or more neural networks (or other suitable machine learning algorithms) are trained on the training data, as indicated at step 704. Additionally or alternatively, the neural network(s) may be pretrained on natural images (e.g., images from an ImageNet database) and then retrained (e.g., via transfer learning or the like) on the training data.

In general, the neural network can be trained by optimizing network parameters (e.g., weights, biases, or both) based on minimizing a loss function. As one non-limiting example, the loss function may be a mean squared error loss function.

Training a neural network may include initializing the neural network, such as by computing, estimating, or otherwise selecting initial network parameters (e.g., weights, biases, or both). During training, an artificial neural network receives the inputs for a training example and generates an output using the bias for each node, and the connections between each node and the corresponding weights. For instance, training data can be input to the initialized neural network, generating output as intracranial abnormality probability scores. The artificial neural network then compares the generated output with the actual output of the training example in order to evaluate the quality of the intracranial abnormality probability scores. For instance, the intracranial abnormality probability scores can be passed to a loss function to compute an error. The current neural network can then be updated based on the calculated error (e.g., using backpropagation methods based on the calculated error). For instance, the current neural network can be updated by updating the network parameters (e.g., weights, biases, or both) in order to minimize the loss according to the loss function. The training continues until a training condition is met. The training condition may correspond to, for example, a predetermined number of training examples being used, a minimum accuracy threshold being reached during training and validation, a predetermined number of validation iterations being completed, and the like. When the training condition has been met (e.g., by determining whether an error threshold or other stopping criterion has been satisfied), the current neural network and its associated network parameters represent the trained neural network. Different types of training processes can be used to adjust the bias values and the weights of the node connections based on the training examples. The training processes may include, for example, gradient descent, Newton's method, conjugate gradient, quasi-Newton, Levenberg-Marquardt, among others.

The artificial neural network can be constructed or otherwise trained based on training data using one or more different learning techniques, such as supervised learning, unsupervised learning, reinforcement learning, ensemble learning, active learning, transfer learning, or other suitable learning techniques for neural networks. As an example, supervised learning involves presenting a computer system with example inputs and their actual outputs (e.g., categorizations). In these instances, the artificial neural network is configured to learn a general rule or model that maps the inputs to the outputs based on the provided example input—output pairs.

The one or more trained neural networks are then stored for later use, as indicated at step 706. Storing the neural network(s) may include storing network parameters (e.g., weights, biases, or both), which have been computed or otherwise estimated by training the neural network(s) on the training data. Storing the trained neural network(s) may also include storing the particular neural network architecture to be implemented. For instance, data pertaining to the layers in the neural network architecture (e.g., number of layers, type of layers, ordering of layers, connections between layers, hyperparameters for layers) may be stored.

Figure 8A:
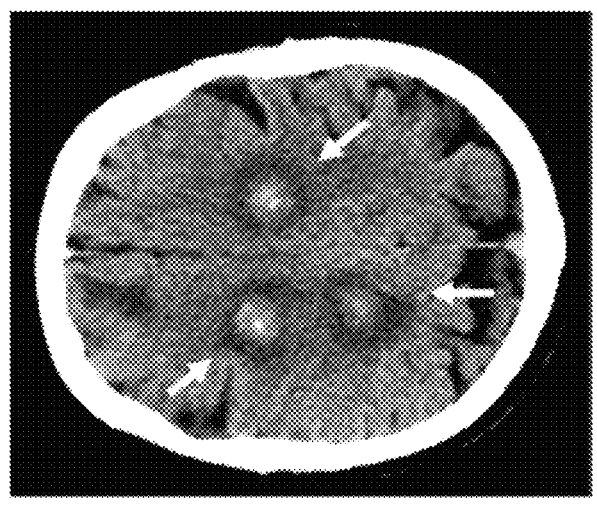
FIGS. 8A-8C show medical images that were classified as high probability cases (IC+) with hemorrhagic intracranial abnormalities indicative of an ischemic stroke mimic.
Figure 8B:
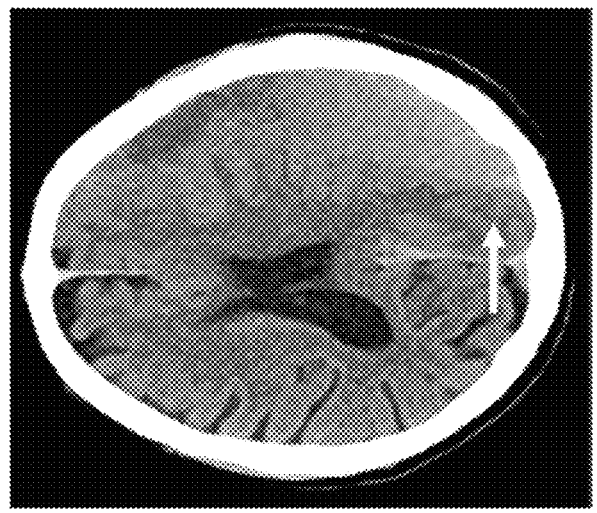
Figure 8C:
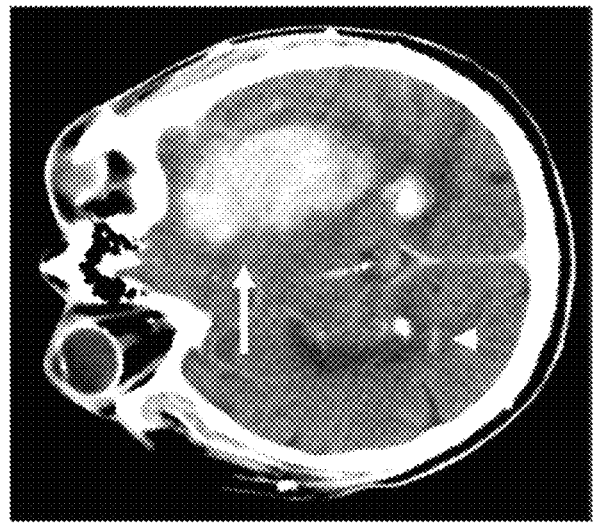

As an example, FIGS. 8A-8C show medical images that were classified as high probability cases (IC+) with hemorrhagic intracranial abnormalities indicative of an ischemic stroke mimic. FIG. 8A shows a non-contrast head CT with multicompartmental intracranial hemorrhage with a large intraparenchymal hematoma centered in the left basal ganglia (arrow) as well as intraventricular hemorrhages within the bilateral occipital horns (arrowhead). FIG. 8B shows a non-contrast head CT that demonstrates a large, mixed attenuation, left holohemispheric subdural hematoma (arrow), measuring up to 3.3 cm in thickness and resulting in a rightward midline shift of 0.8 cm. FIG. 8C shows a head CT that demonstrates multifocal, hyperdense parenchymal mass lesions (arrows).

Figure 9A:
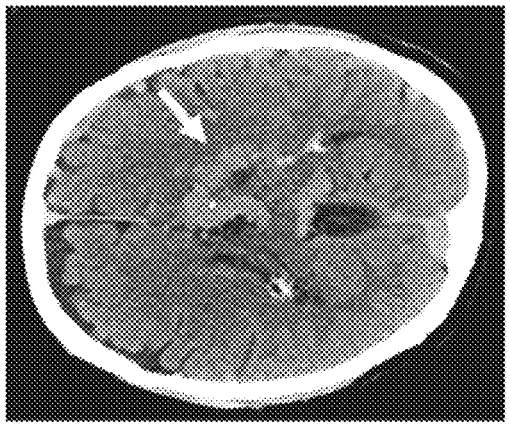
FIGS. 9A-9F show medical images that were classified as high probability cases (IC+) with non-hemorrhagic intracranial abnormalities indicative of an ischemic stroke mimic.
Figure 9B:
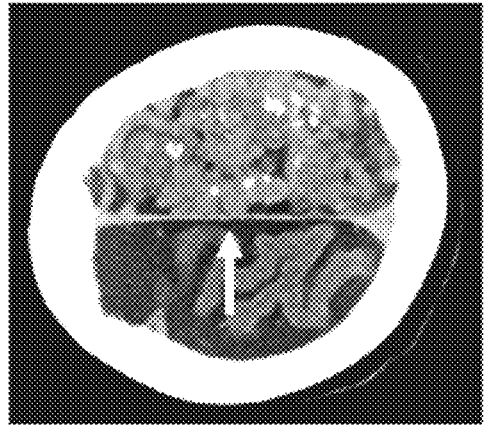
Figure 9C:
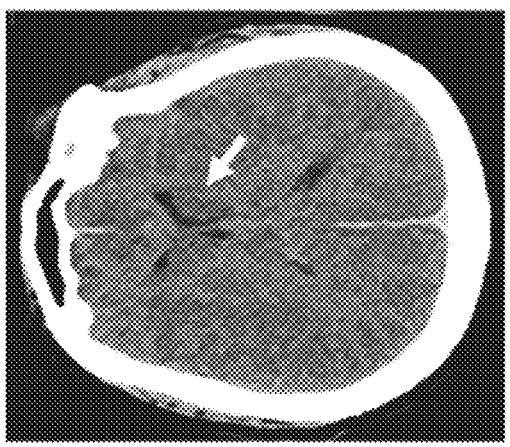
Figure 9D:
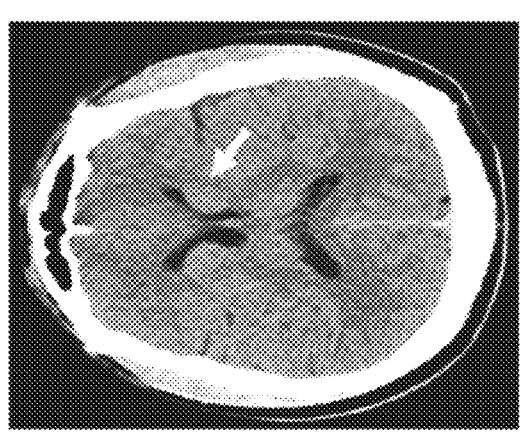
Figure 9E:
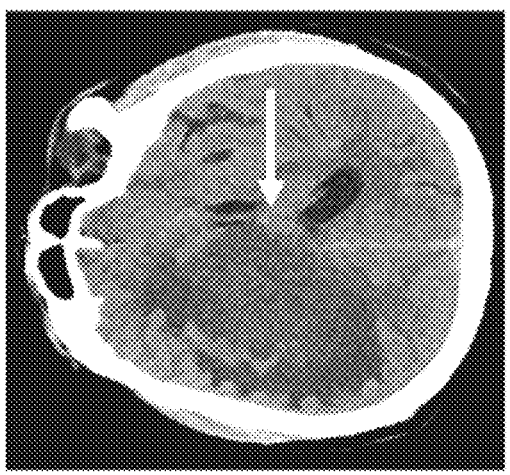
Figure 9F:
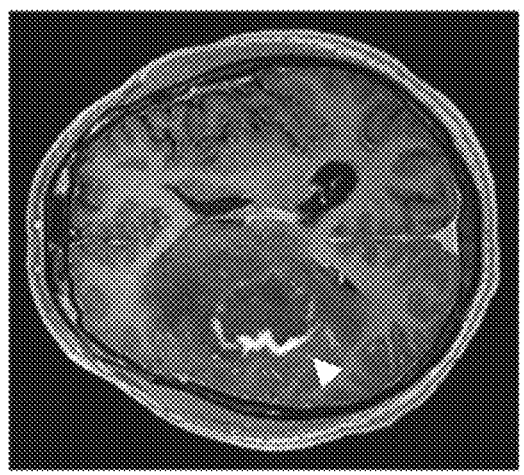

FIGS. 9A-9F show medical images that were classified as high probability cases (IC+) with non-hemorrhagic intracranial abnormalities indicative of an ischemic stroke mimic. FIG. 9A shows a non-contrast CT images that demonstrates a large area of confluent hypoattenuation involving the right cerebral hemisphere (arrow) with marked mass effect and leftward midline shift. FIG. 9B shows a subsequent contrast-enhanced MRI for the same subject, which demonstrates a peripherally enhancing lesion centered at the right basal ganglia and insula. The final diagnosis was central nerve system toxoplasmosis. FIG. 9C shows a non-contrast head CT that demonstrates diffuse reversal of gray-white differentiation as well as partial effacement of the ventricles, most consistent with diffuse cerebral edema from a severe hypoxic-ischemic injury. For instance, the left caudate head has a more hypodense appearance compared to the adjacent internal capsule (arrow) whereas in a normal patient (FIG. 9D), the caudate head is relatively more hyperdense. FIGS. 9E and 9F show images of a patient with a large, left hemispheric, Spetzler Martin grade 5 arteriovenous malformation.

Figure 10A:
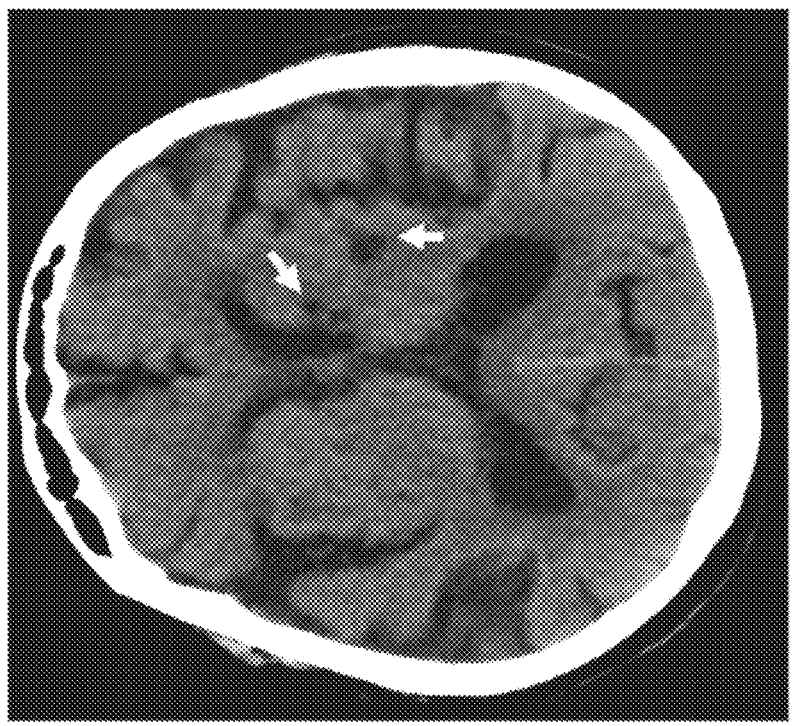
FIGS. 10A-10B show examples of medical images that were classified as low probability cases (IC−).
Figure 10B:
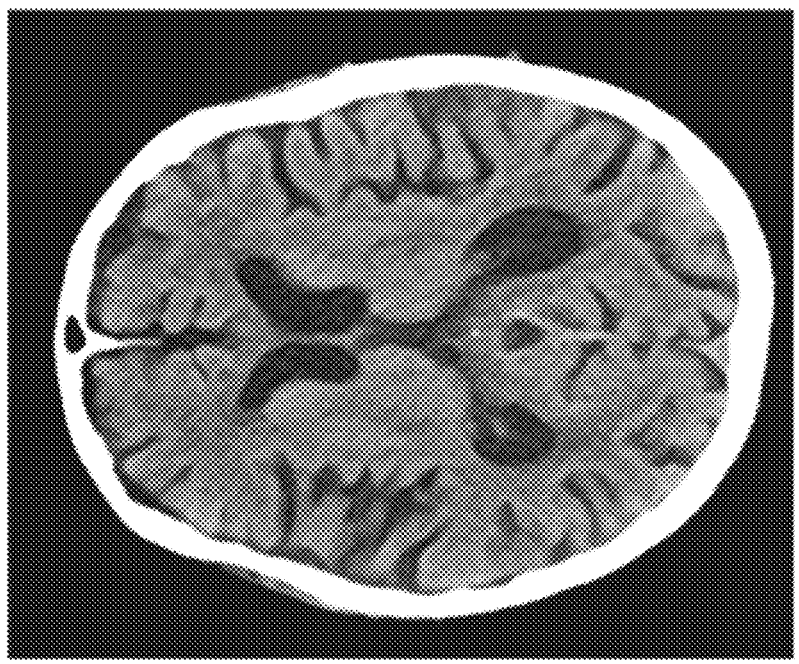

FIGS. 10A and 10B show examples of medical images that were classified as low probability cases (IC−). FIG. 10A shows a non-contrast head CT without notable intracranial abnormality. FIG. 10B shows an image with small old infarcts involving the left basal ganglia and left internal capsule (arrows).

Figure 11A:
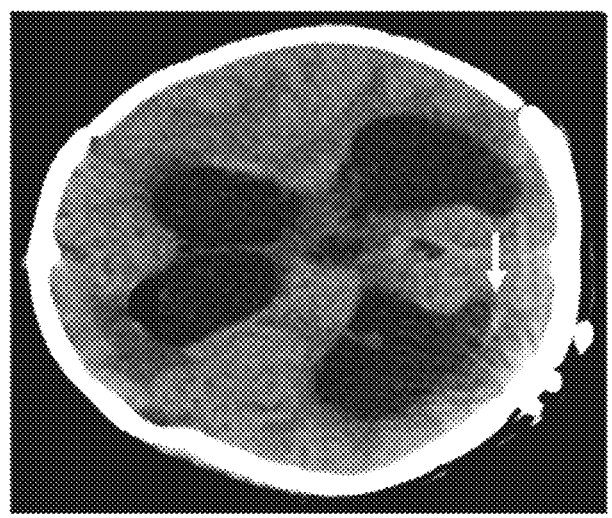
FIGS. 11A-11C show examples of medical images that were classified as algorithmically uncertain (or indeterminate) cases (IC±).
Figure 11B:
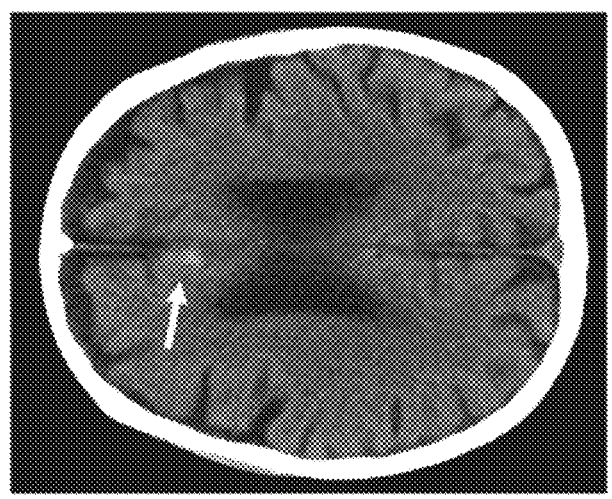
Figure 11C:
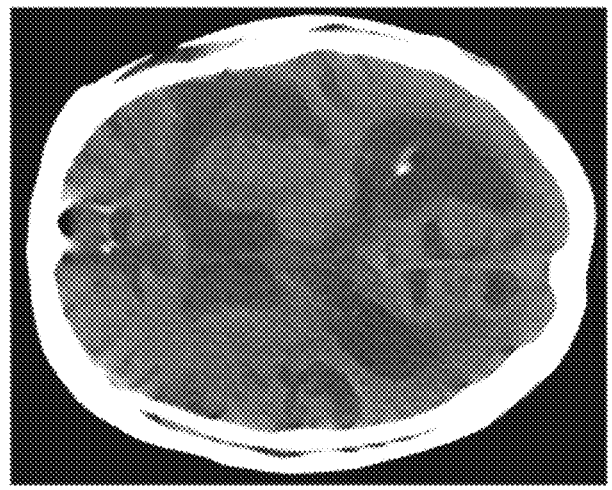

FIGS. 11A-C show examples of medical images that were classified as algorithmically uncertain (or indeterminate) cases (IC±). FIG. 11A shows a head CT obscured by motion degradation. FIG. 11B shows an image depicting trace acute subarachnoid hemorrhage along the right cingulate gyms (arrow). FIG. 11C shows an image depicting trace intraventricular hemorrhage (arrow) obscured by streak artifact from the adjacent ventriculoperitoneal shunt hardware.

By incorporating algorithmic uncertainty into a machine learning algorithm for the identification of significant acute intracranial abnormalities on head CTs (or other medical images), the systems and methods described in the present disclosure provide for a three-tier classification system that may have significant clinical utility as a prioritization tool. The machine learning algorithm identifies acute intracranial abnormalities, such as mass lesions or vascular malformations with significant tissue shift, and diffuse cerebral edema, among others. This feature is advantageous because these abnormalities can often mimic ischemic or hemorrhagic stroke symptoms and often require immediate medical attention.

The disclosed systems and methods provide an advantageous tool that may be readily incorporated into clinical practice, and may also alleviate the potential issue of prioritizing studies with a single intracranial abnormality (e.g., hemorrhage) that can lead to inadvertent delays in the interpretation of studies with other intracranial abnormalities. For instance, in a clinical practice where an intracranial hemorrhage detection algorithm is implemented for worklist prioritization, a study with a large non-hemorrhagic mass with herniation requiring immediate attention may be shifted to the lower end of the reading queue due to the absence of intracranial hemorrhage.

The disclosed systems and methods may also be advantageous in the outpatient setting, where patients may have unexpected abnormalities that require urgent medical attention. For instance, the systems and methods may be used as a triage mechanism whereby physicians may be rapidly alerted to patients with a high probability of a significant intracranial malady. Implementing the systems and methods described in the present disclosure can expedite the identification of patients with more urgent needs for admission and intervention, especially in the emergency department. The systems and methods also allow for flexibility in additional types of clinical settings. For instance, components of practices that have a longer time interval between the study scan time to radiologist interpretation, such as outpatient imaging centers, may choose to triage to higher priority both on the IC+ and IC± cases to ensure a more timely identification of acute intracranial abnormality.

Figure 12:
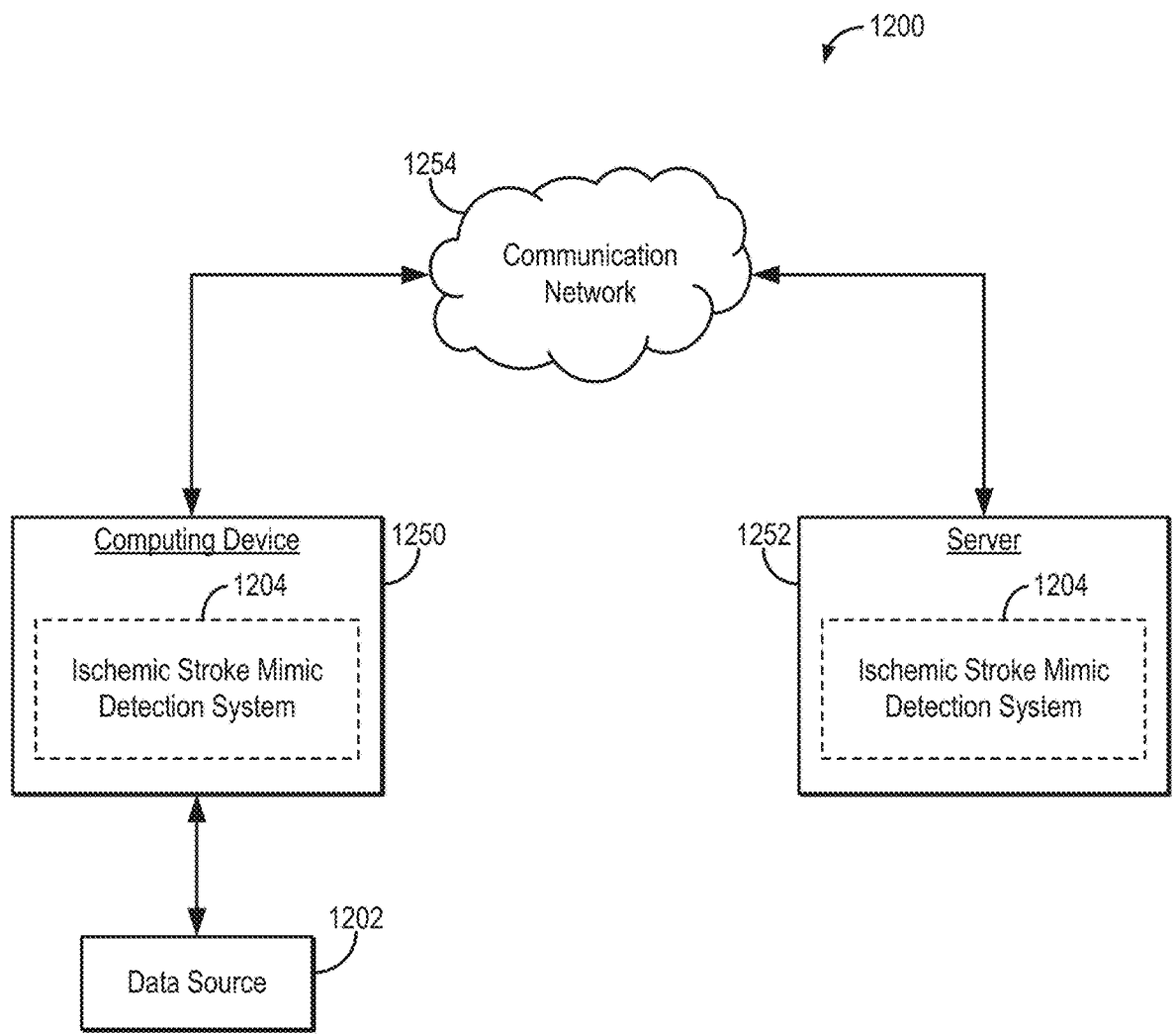
FIG. 12 is a block diagram of an example ischemic stroke mimic detection system.

Referring now to FIG. 12, an example of a system 1200 for ischemic stroke mimic detection in accordance with some embodiments of the systems and methods described in the present disclosure is shown. As shown in FIG. 12, a computing device 1250 can receive one or more types of data (e.g., medical images) from data source 1202. In some embodiments, computing device 1250 can execute at least a portion of an ischemic stroke mimic detection system 1204 to predict the presence of ischemic stroke mimics from medical image data received from the data source 1202.

Additionally or alternatively, in some embodiments, the computing device 1250 can communicate information about data received from the data source 1202 to a server 1252 over a communication network 1254, which can execute at least a portion of the ischemic stroke mimic detection system 1204. In such embodiments, the server 1252 can return information to the computing device 1250 (and/or any other suitable computing device) indicative of an output of the ischemic stroke mimic detection system 1204.

In some embodiments, computing device 1250 and/or server 1252 can be any suitable computing device or combination of devices, such as a desktop computer, a laptop computer, a smartphone, a tablet computer, a wearable computer, a server computer, a virtual machine being executed by a physical computing device, and so on. The computing device 1250 and/or server 1252 can also reconstruct images from the data.

In some embodiments, data source 1202 can be any suitable source of data (e.g., measurement data, images reconstructed from measurement data, processed image data), such as a medical imaging system (e.g., a CT system), another computing device (e.g., a server storing measurement data, images reconstructed from measurement data, processed image data), and so on. In some embodiments, data source 1202 can be local to computing device 1250. For example, data source 1202 can be incorporated with computing device 1250 (e.g., computing device 1250 can be configured as part of a device for measuring, recording, estimating, acquiring, or otherwise collecting or storing data). As another example, data source 1202 can be connected to computing device 1250 by a cable, a direct wireless link, and so on. Additionally or alternatively, in some embodiments, data source 1202 can be located locally and/or remotely from computing device 1250, and can communicate data to computing device 1250 (and/or server 1252) via a communication network (e.g., communication network 1254).

In some embodiments, communication network 1254 can be any suitable communication network or combination of communication networks. For example, communication network 1254 can include a Wi-Fi network (which can include one or more wireless routers, one or more switches, etc.), a peer-to-peer network (e.g., a Bluetooth network), a cellular network (e.g., a 3G network, a 4G network, etc., complying with any suitable standard, such as CDMA, GSM, LTE, LTE Advanced, WiMAX, etc.), other types of wireless network, a wired network, and so on. In some embodiments, communication network 1254 can be a local area network, a wide area network, a public network (e.g., the Internet), a private or semi-private network (e.g., a corporate or university intranet), any other suitable type of network, or any suitable combination of networks. Communications links shown in FIG. 12 can each be any suitable communications link or combination of communications links, such as wired links, fiber optic links, Wi-Fi links, Bluetooth links, cellular links, and so on.

Figure 13:
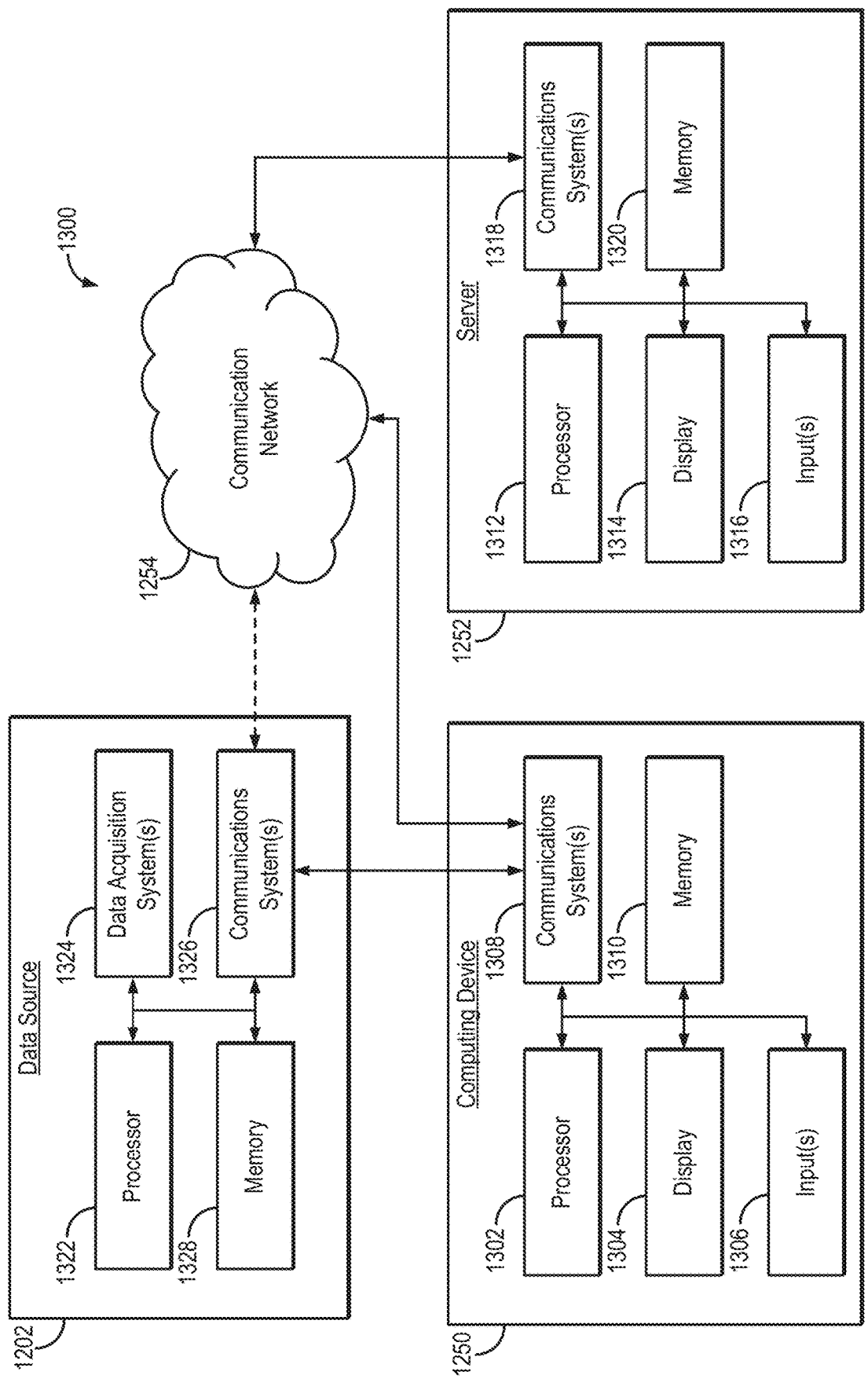
FIG. 13 is a block diagram of example components that can implement the system of FIG. 13.

Referring now to FIG. 13, an example of hardware 1300 that can be used to implement data source 1202, computing device 1250, and server 1252 in accordance with some embodiments of the systems and methods described in the present disclosure is shown.

As shown in FIG. 13, in some embodiments, computing device 1250 can include a processor 1302, a display 1304, one or more inputs 1306, one or more communication systems 1308, and/or memory 1310. In some embodiments, processor 1302 can be any suitable hardware processor or combination of processors, such as a central processing unit ("CPU"), a graphics processing unit ("GPU"), and so on. In some embodiments, display 1304 can include any suitable display devices, such as a liquid crystal display ("LCD") screen, a light-emitting diode ("LED") display, an organic LED ("OLED") display, an electrophoretic display (e.g., an "e-ink" display), a computer monitor, a touchscreen, a television, and so on. In some embodiments, inputs 1306 can include any suitable input devices and/or sensors that can be used to receive user input, such as a keyboard, a mouse, a touchscreen, a microphone, and so on.

In some embodiments, communications systems 1308 can include any suitable hardware, firmware, and/or software for communicating information over communication network 1254 and/or any other suitable communication networks. For example, communications systems 1308 can include one or more transceivers, one or more communication chips and/or chip sets, and so on. In a more particular example, communications systems 1308 can include hardware, firmware, and/or software that can be used to establish a Wi-Fi connection, a Bluetooth connection, a cellular connection, an Ethernet connection, and so on.

In some embodiments, memory 1310 can include any suitable storage device or devices that can be used to store instructions, values, data, or the like, that can be used, for example, by processor 1302 to present content using display 1304, to communicate with server 1252 via communications system(s) 1308, and so on. Memory 1310 can include any suitable volatile memory, non-volatile memory, storage, or any suitable combination thereof. For example, memory 1310 can include random-access memory ("RAM"), read-only memory ("ROM"), electrically programmable ROM ("EPROM"), electrically erasable ROM ("EEPROM"), other forms of volatile memory, other forms of non-volatile memory, one or more forms of semi-volatile memory, one or more flash drives, one or more hard disks, one or more solid state drives, one or more optical drives, and so on. In some embodiments, memory 1310 can have encoded thereon, or otherwise stored therein, a computer program for controlling operation of computing device 1250. In such embodiments, processor 1302 can execute at least a portion of the computer program to present content (e.g., images, user interfaces, graphics, tables), receive content from server 1252, transmit information to server 1252, and so on. For example, the processor 1302 and the memory 1310 can be configured to perform the methods described herein (e.g., the workflow illustrated in FIG. 1, the method of FIG. 6, the method of FIG. 7).

In some embodiments, server 1252 can include a processor 1312, a display 1314, one or more inputs 1316, one or more communications systems 1318, and/or memory 1320. In some embodiments, processor 1312 can be any suitable hardware processor or combination of processors, such as a CPU, a GPU, and so on. In some embodiments, display 1314 can include any suitable display devices, such as an LCD screen, LED display, OLED display, electrophoretic display, a computer monitor, a touchscreen, a television, and so on. In some embodiments, inputs 1316 can include any suitable input devices and/or sensors that can be used to receive user input, such as a keyboard, a mouse, a touchscreen, a microphone, and so on.

In some embodiments, communications systems 1318 can include any suitable hardware, firmware, and/or software for communicating information over communication network 1254 and/or any other suitable communication networks. For example, communications systems 1318 can include one or more transceivers, one or more communication chips and/or chip sets, and so on. In a more particular example, communications systems 1318 can include hardware, firmware, and/or software that can be used to establish a Wi-Fi connection, a Bluetooth connection, a cellular connection, an Ethernet connection, and so on.

In some embodiments, memory 1320 can include any suitable storage device or devices that can be used to store instructions, values, data, or the like, that can be used, for example, by processor 1312 to present content using display 1314, to communicate with one or more computing devices 1250, and so on. Memory 1320 can include any suitable volatile memory, non-volatile memory, storage, or any suitable combination thereof. For example, memory 1320 can include RAM, ROM, EPROM, EEPROM, other types of volatile memory, other types of non-volatile memory, one or more types of semi-volatile memory, one or more flash drives, one or more hard disks, one or more solid state drives, one or more optical drives, and so on. In some embodiments, memory 1320 can have encoded thereon a server program for controlling operation of server 1252. In such embodiments, processor 1312 can execute at least a portion of the server program to transmit information and/or content (e.g., data, images, a user interface) to one or more computing devices 1250, receive information and/or content from one or more computing devices 1250, receive instructions from one or more devices (e.g., a personal computer, a laptop computer, a tablet computer, a smartphone), and so on.

In some embodiments, the server 1252 is configured to perform the methods described in the present disclosure. For example, the processor 1312 and memory 1320 can be configured to perform the methods described herein (e.g., the workflow illustrated in FIG. 1, the method of FIG. 6, the method of FIG. 7).

In some embodiments, data source 1202 can include a processor 1322, one or more data acquisition systems 1324, one or more communications systems 1326, and/or memory 1328. In some embodiments, processor 1322 can be any suitable hardware processor or combination of processors, such as a CPU, a GPU, and so on. In some embodiments, the one or more data acquisition systems 1324 are generally configured to acquire data, images, or both, and can include a medical imaging system, such as a CT system. Additionally or alternatively, in some embodiments, the one or more data acquisition systems 1324 can include any suitable hardware, firmware, and/or software for coupling to and/or controlling operations of a medical imaging system, such as a CT system. In some embodiments, one or more portions of the data acquisition system(s) 1324 can be removable and/or replaceable.

Note that, although not shown, data source 1202 can include any suitable inputs and/or outputs. For example, data source 1202 can include input devices and/or sensors that can be used to receive user input, such as a keyboard, a mouse, a touchscreen, a microphone, a trackpad, a trackball, and so on. As another example, data source 1202 can include any suitable display devices, such as an LCD screen, an LED display, an OLED display, an electrophoretic display, a computer monitor, a touchscreen, a television, etc., one or more speakers, and so on.

In some embodiments, communications systems 1326 can include any suitable hardware, firmware, and/or software for communicating information to computing device 1250 (and, in some embodiments, over communication network 1254 and/or any other suitable communication networks). For example, communications systems 1326 can include one or more transceivers, one or more communication chips and/or chip sets, and so on. In a more particular example, communications systems 1326 can include hardware, firmware, and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, and so on.

In some embodiments, memory 1328 can include any suitable storage device or devices that can be used to store instructions, values, data, or the like, that can be used, for example, by processor 1322 to control the one or more data acquisition systems 1324, and/or receive data from the one or more data acquisition systems 1324; to generate images from data; present content (e.g., data, images, a user interface) using a display; communicate with one or more computing devices 1250; and so on. Memory 1328 can include any suitable volatile memory, non-volatile memory, storage, or any suitable combination thereof. For example, memory 1328 can include RAM, ROM, EPROM, EEPROM, other types of volatile memory, other types of non-volatile memory, one or more types of semi-volatile memory, one or more flash drives, one or more hard disks, one or more solid state drives, one or more optical drives, and so on. In some embodiments, memory 1328 can have encoded thereon, or otherwise stored therein, a program for controlling operation of data source 1202. In such embodiments, processor 1322 can execute at least a portion of the program to generate images, transmit information and/or content (e.g., data, images, a user interface) to one or more computing devices 1250, receive information and/or content from one or more computing devices 1250, receive instructions from one or more devices (e.g., a personal computer, a laptop computer, a tablet computer, a smartphone, etc.), and so on.

In some embodiments, any suitable computer-readable media can be used for storing instructions for performing the functions and/or processes described herein. For example, in some embodiments, computer-readable media can be transitory or non-transitory. For example, non-transitory computer-readable media can include media such as magnetic media (e.g., hard disks, floppy disks), optical media (e.g., compact discs, digital video discs, Blu-ray discs), semiconductor media (e.g., RAM, flash memory, EPROM, EEPROM), any suitable media that is not fleeting or devoid of any semblance of permanence during transmission, and/or any suitable tangible media. As another example, transitory computer-readable media can include signals on networks, in wires, conductors, optical fibers, circuits, or any suitable media that is fleeting and devoid of any semblance of permanence during transmission, and/or any suitable intangible media.

As used herein in the context of computer implementation, unless otherwise specified or limited, the terms "component," "system," "module," "framework," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

Figure 14A:
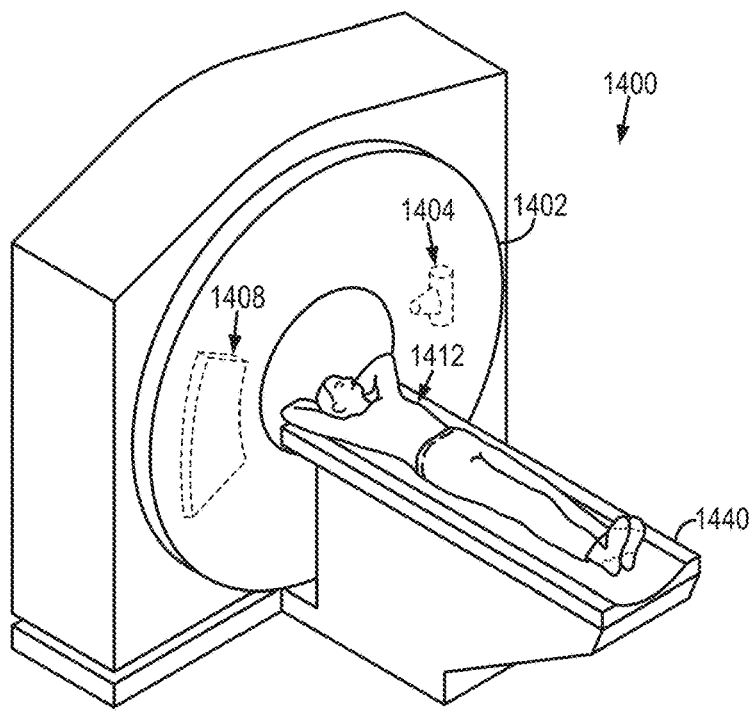
FIGS. 14A-14B show an example computed tomography ("CT") that can be implemented in some examples described in the present disclosure.
Figure 14B:
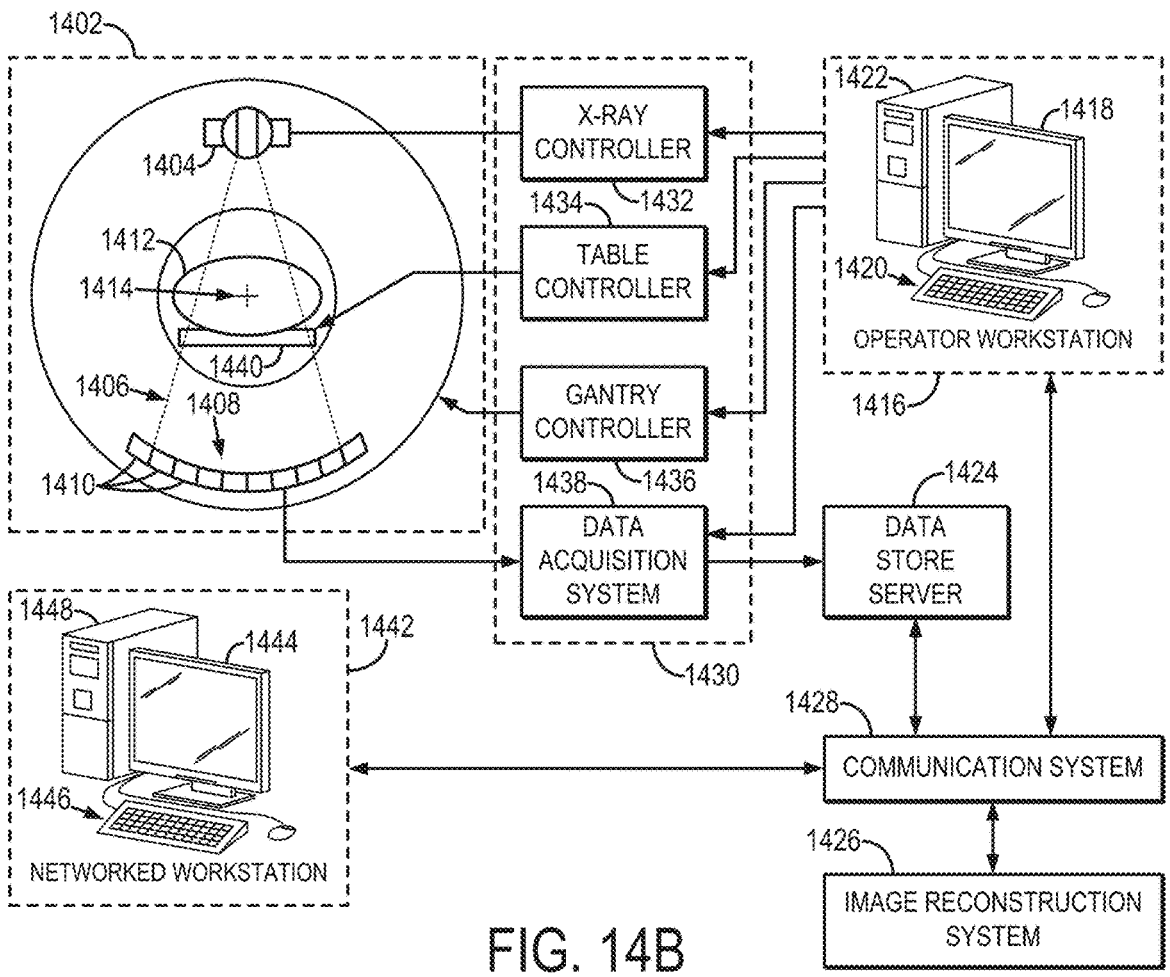

Referring particularly now to FIGS. 14A and 14B, an example of an x-ray computed tomography ("CT") imaging system 1400 is illustrated. The CT system includes a gantry 1402, to which at least one x-ray source 1404 is coupled. The x-ray source 1404 projects an x-ray beam 1406, which may be a fan-beam or cone-beam of x-rays, towards a detector array 1408 on the opposite side of the gantry 1402. The detector array 1408 includes a number of x-ray detector elements 1410. Together, the x-ray detector elements 1410 sense the projected x-rays 1406 that pass through a subject 1412, such as a medical patient or an object undergoing examination, that is positioned in the CT system 1400. Each x-ray detector element 1410 produces an electrical signal that may represent the intensity of an impinging x-ray beam and, hence, the attenuation of the beam as it passes through the subject 1412. In some configurations, each x-ray detector 1410 is capable of counting the number of x-ray photons that impinge upon the detector 1410. During a scan to acquire x-ray projection data, the gantry 1402 and the components mounted thereon rotate about a center of rotation 1414 located within the CT system 1400.

The CT system 1400 also includes an operator workstation 1416, which typically includes a display 1418; one or more input devices 1420, such as a keyboard and mouse; and a computer processor 1422. The computer processor 1422 may include a commercially available programmable machine running a commercially available operating system. The operator workstation 1416 provides the operator interface that enables scanning control parameters to be entered into the CT system 1400. In general, the operator workstation 1416 is in communication with a data store server 1424 and an image reconstruction system 1426. By way of example, the operator workstation 1416, data store sever 1424, and image reconstruction system 1426 may be connected via a communication system 1428, which may include any suitable network connection, whether wired, wireless, or a combination of both. As an example, the communication system 1428 may include both proprietary or dedicated networks, as well as open networks, such as the internet.

The operator workstation 1416 is also in communication with a control system 1430 that controls operation of the CT system 1400. The control system 1430 generally includes an x-ray controller 1432, a table controller 1434, a gantry controller 1436, and a data acquisition system 1438. The x-ray controller 1432 provides power and timing signals to the x-ray source 1404 and the gantry controller 1436 controls the rotational speed and position of the gantry 1402. The table controller 1434 controls a table 1440 to position the subject 1412 in the gantry 1402 of the CT system 1400.

The DAS 1438 samples data from the detector elements 1410 and converts the data to digital signals for subsequent processing. For instance, digitized x-ray data is communicated from the DAS 1438 to the data store server 1424. The image reconstruction system 1426 then retrieves the x-ray data from the data store server 1424 and reconstructs an image therefrom. The image reconstruction system 1426 may include a commercially available computer processor, or may be a highly parallel computer architecture, such as a system that includes multiple-core processors and massively parallel, high-density computing devices. Optionally, image reconstruction can also be performed on the processor 1422 in the operator workstation 1416. Reconstructed images can then be communicated back to the data store server 1424 for storage or to the operator workstation 1416 to be displayed to the operator or clinician.

The CT system 1400 may also include one or more networked workstations 1442. By way of example, a networked workstation 1442 may include a display 1444; one or more input devices 1446, such as a keyboard and mouse; and a processor 1448. The networked workstation 1442 may be located within the same facility as the operator workstation 1416, or in a different facility, such as a different healthcare institution or clinic.

The networked workstation 1442, whether within the same facility or in a different facility as the operator workstation 1416, may gain remote access to the data store server 1424 and/or the image reconstruction system 1426 via the communication system 1428. Accordingly, multiple networked workstations 1442 may have access to the data store server 1424 and/or image reconstruction system 1426. In this manner, x-ray data, reconstructed images, or other data may be exchanged between the data store server 1424, the image reconstruction system 1426, and the networked workstations 1442, such that the data or images may be remotely processed by a networked workstation 1442. This data may be exchanged in any suitable format, such as in accordance with the transmission control protocol ("TCP"), the internet protocol ("IP"), or other known or suitable protocols.

The present disclosure has described one or more preferred embodiments, and it should be appreciated that many equivalents, alternatives, variations, and modifications, aside from those expressly stated, are possible and within the scope of the invention.

The invention claimed is:

1. A method for predicting a presence of an ischemic stroke mimic based on medical images acquired from a subject, the method comprising:
    accessing medical image data with a computer system, the medical image data comprising medical images acquired from a head of the subject with a medical imaging system;
    accessing a machine learning model with the computer system, wherein the machine learning model a plurality of deep convolutional neural networks and has been trained on training data to estimate a probability of an acute intracranial abnormality being depicted in a medical image;
    generating intracranial abnormality prediction data by inputting the medical image data to each of the plurality of deep convolutional neural networks of the machine learning model using the computer system, generating the intracranial abnormality prediction data as an output that includes a different set of probability scores for each of the medical images, wherein the intracranial abnormality prediction data comprises an intracranial abnormality probability score for each of the medical images in the medical image data;
    generating an ischemic stroke mimic classification for the medical image data using the computer system to classify the medical image data based on the intracranial abnormality prediction data;
    displaying the ischemic stroke mimic classification for the medical image data to a user with the computer system; and
    wherein the intracranial abnormality prediction data are generated based on an ensemble model that combines the probability scores from each of the plurality of deep convolutional neural networks for each of the medical images.

2. The method of claim 1, wherein the ensemble model comprises an unweighted average of the probability scores predicted by each of the plurality of deep convolutional neural networks for each of the medical images.

3. The method of claim 1, wherein the ischemic stroke mimic classification indicates the medical image data are probable for an ischemic stroke mimic when a number of the medical images have probability scores at or above a threshold.

4. The method of claim 3, wherein the threshold is 0.9.

5. The method of claim 3, wherein the number of the medical images comprises at least three of the medical images.

6. The method of claim 1, wherein the ischemic stroke mimic classification indicates the medical image data are not probable for an ischemic stroke mimic when none of the medical images have probability scores at or above a threshold.

7. The method of claim 6, wherein the threshold is 0.6.

8. The method of claim 1, wherein the acute intracranial abnormality of which the probability is estimated by the machine learning model comprises at least one of diffuse cerebral edema, masses, vascular malformations, or mass effects.

9. The method of claim 8, wherein the mass effects comprise at least one of herniation shift, midline shift, partial effacement of ventricles, or complete effacement of ventricles.

10. The method of claim 1, wherein the medical imaging system is a computed tomography (CT) system.

11. The method of claim 1, wherein the medical images in the medical image data comprise two-dimensional slices of the head of the subject.

12. The method of claim 10, wherein the medical image data comprise a three-dimensional image volume and the medical images in the medical image data comprise two-dimensional slices extracted from the three-dimensional image volume.

13. A method for predicting a presence of an ischemic stroke mimic based on medical images acquired from a subject, the method comprising:
    accessing medical image data with a computer system, the medical image data comprising medical images acquired from a head of the subject with a medical imaging system;
    accessing a machine learning model with the computer system, wherein the machine learning model has been trained on training data to estimate a probability of an acute intracranial abnormality being depicted in a medical image;
    generating intracranial abnormality prediction data by inputting the medical image data to the machine learning model using the computer system, generating the intracranial abnormality prediction data as an output, wherein the intracranial abnormality prediction data comprises an intracranial abnormality probability score for each of the medical images in the medical image data;
    generating an ischemic stroke mimic classification for the medical image data using the computer system to classify the medical image data based on the intracranial abnormality prediction data;
    displaying the ischemic stroke mimic classification for the medical image data to a user with the computer system;
    wherein the ischemic stroke mimic classification indicates the medical image data are not probable for an ischemic stroke mimic when only fewer than a number of the medical images have probability scores at or above a threshold; and
    wherein the number of the medical images consists of two of the medical images.

14. A method for predicting a presence of an ischemic stroke mimic based on medical images acquired from a subject, the method comprising:
    accessing medical image data with a computer system, the medical image data comprising medical images acquired from a head of the subject with a medical imaging system;
    accessing a machine learning model with the computer system, wherein the machine learning model has been trained on training data to estimate a probability of an acute intracranial abnormality being depicted in a medical image;
    generating intracranial abnormality prediction data by inputting the medical image data to the machine learning model using the computer system, generating the intracranial abnormality prediction data as an output, wherein the intracranial abnormality prediction data comprises an intracranial abnormality probability score for each of the medical images in the medical image data;
    generating an ischemic stroke mimic classification for the medical image data using the computer system to classify the medical image data based on the intracranial abnormality prediction data;
    displaying the ischemic stroke mimic classification for the medical image data to a user with the computer system; and
    creating a prediction basis for the intracranial abnormality prediction data generated by the machine learning algorithm by selecting at least one image feature from an atlas comprising a set of image features and a set of training images, wherein each image feature is assigned with at least one training image associated with an intracranial abnormality.

* * * * *